B. W. LINDQUIST.
METHOD OF TRIMMING BLANKS.
APPLICATION FILED JULY 15, 1920.

1,399,132.

Patented Dec. 6, 1921.

INVENTOR-
B. W. Lindquist
BY W. H. Lieber
ATTORNEY.

UNITED STATES PATENT OFFICE.

BIRGER W. LINDQUIST, OF DETROIT, MICHIGAN, ASSIGNOR TO THE VIXSON COMPANY, OF DETROIT, MICHIGAN, A CORPORATION OF MICHIGAN.

METHOD OF TRIMMING BLANKS.

1,399,132.  Specification of Letters Patent.  Patented Dec. 6, 1921.

Application filed July 15, 1920. Serial No. 396,551.

*To all whom it may concern:*

Be it known that I, BIRGER W. LINDQUIST, a citizen of the United States, residing at Detroit, in the county of Wayne and State of Michigan, have invented a certain new and useful Method of Trimming Blanks, of which the following is a specification.

This invention relates in general to an improved process of finishing articles such as metallic bodies, and relates specifically to an improved method of automatically trimming the heads of set screw blanks or the like, in succession.

An object of the invention is to provide a simple and efficient method of trimming set screw blanks or the like. Another object of the invention is to provide a process of finishing the heads of set screw blanks or the like, which will permit more rapid, uniform and accurate trimming of the successive blanks, than has been possible with existing methods.

It has heretofore been the universal commercial practice to automatically trim or dress the side surfaces of the heads of cold and hot pressed set screw blanks and the like, with the aid of automatic machines known as bolt head trimmers. These machines are adapted to automatically position the rough blanks in succession with the cylindrical blank shanks in the central recess of a reciprocating abutment or plunger and to move the plunger against the shoulders at the shank ends thus forcing the blanks in a direction longitudinally of their axes, through the opening of a stationary die. With this method of trimming, many of the finished set screw blanks are imperfect or defective for several reasons. One of these reasons is that if the movable abutment and the stationary die are not perfectly centered or alined, the heads of the finished blanks will be eccentric relatively to the blank shanks. Another reason for the production of imperfect finished blanks, is that the central recess of the movable plunger will not always center the blanks, thereby also producing finished blanks having eccentric heads. Besides these, there are other reasons which contribute to the production of imperfect finished articles and which prevent operation of the trimming machines at maximum speed and with best efficiency.

The present invention contemplates the provision of a simple method whereby the heads of set screw blanks and the like may be automatically dressed or trimmed with maximum speed and highest efficiency, and which will produce uniform and perfect finished articles. The improved method permits the use, with relatively slight alterations, of standard apparatus such as the automatic bolt head trimmers now employed, and enhances the efficiency of such machines by augmenting the output thereof. While the new method is especially advantageous when utilized to finish the heads of set screw blanks, the term "set screw" should not be considered as an essential limitation of this invention.

A clear conception of the several steps comprising the improved method and of the apparatus for exploiting the same, may be had by referring to the drawing accompanying and forming a part of this specification, in which like reference characters designate the same or similar parts in the several views.

Figure 1:
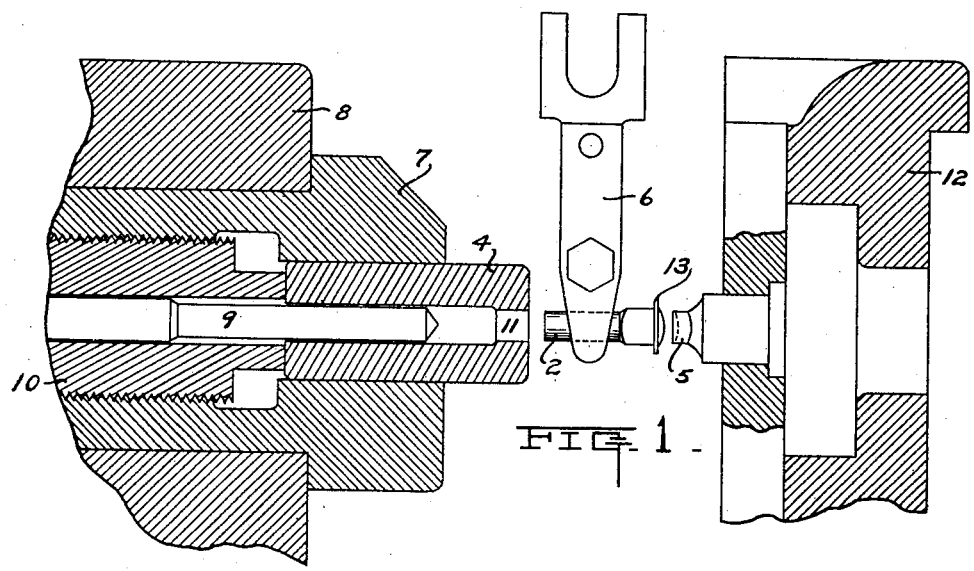
Figure 1 is a fragmentary central vertical section through a blank trimming machine capable of exploiting the improved method, showing a rough blank being positioned in the machine preparatory to trimming.
Figure 2:
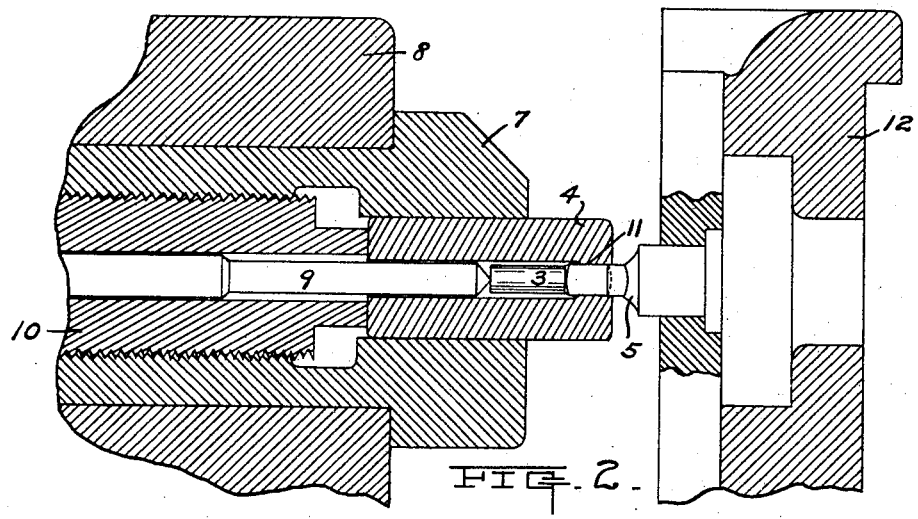
Fig. 2 is a fragmentary central vertical section through the blank trimming machine for exploiting the improved method, showing a set screw blank which has just been trimmed.

The machine fragmentarily illustrated in Figs. 1 and 2, is preferably a modified standard automatic bolt or set screw head trimmer, and comprises a stationary punch holder 12, a stationary abutment or punch 5 rigidly secured to the holder 12, a reciprocable ram 8, a die holder 7 rigidly secured to and movable with the ram 8, a movable die 4 adjustably secured to the holder 7 in any suitable manner as by means of a set screw, and a movable finger 6 for properly positioning the successive rough blanks 2 in the machine. The stationary punch holder 12 is fixed to the frame of the machine. The reciprocable ram 8 is horizontally movable by means of a power driven crank shaft to which the ram is connected in a well known manner. The blank carrying finger 6 is also of well known construction and is adapted to successively receive the individual rough blanks from a feeding hopper and to present the blanks in the position indicated in Fig. 1. The movable die 4 is adjustable longitudinally of the holder 7 by means of an adjusting element 10 which has screw thread coaction with the holder 7 and the end of which abuts against the rear end of the die 4. The die 4 is provided at its forward end with an opening 11 of a size and shape conforming to desired finished dimensions of the set screw heads. Within the central openings of the element 10 and die 4 is located a stripping rod 9 which is adapted to push the rough blanks 2 against the stationary abutment 5, and to subsequently eject the finished blanks 3 from the machine. The actuation of the the stripping rod is effected as in the standard trimmers.

Figure 4:
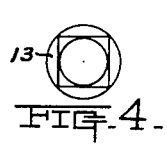
Fig. 4 is an enlarged end elevation of a rough set screw blank, looking toward the shank end thereof.
Figure 3:
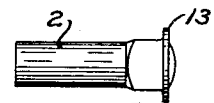
Fig. 3 is an enlarged side elevation of a rough set screw blank.

The rough blanks 2 illustrated in Figs. 3 and 4, may be either hot or cold pressed, and are provided with cylindrical shanks of predetermined diameter and length, and have heads of rectangular prismatic shape which are sufficiently oversize to permit trimming. The cylindrical blank shanks are somewhat smaller in diameter than the distance across flats of the heads, and are joined or connected with the heads by means of tapered portions the generatrices of which form angles of approximately 45 degrees relatively to the blank axes. The blank heads are provided with projecting flanges or fins 13 which facilitate feeding of the blanks to the machine in succession.

Figure 6:
Fig. 6 is an enlarged end elevation of a finished set screw blank, looking toward the shank end thereof.
Figure 5:
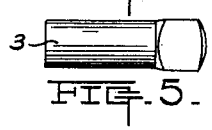
Fig. 5 is an enlarged side elevation of a finished set screw blank.

The finished blanks 3 illustrated in Figs. 5 and 6, are the same as the rough blanks 2 except that the side surfaces of the heads have been dressed to the desired dimensions across flats. The fins 13 have been completely removed during the trimming operations and the distances across flats are but slightly greater than the diameters of the cylindrical blank shanks.

During the normal operation of the trimming machine while engaged in exploiting the improved method, the rough blanks 2 are transferred singly and in succession from the feed hopper to the position indicated in Fig. 1, by means of the automatically movable finger 6. When a blank has been thus positioned, the ram 8 is moved forward carrying with it the die holder 7, die 4 and stripping rod 9. As the end of the blank shank enters the opening 11 of the die, the finger 6 is automatically withdrawn leaving the blank 2 supported by the die 4. The advancing die 4 passes over the cylindrical shank of the blank 2 and eventually engages the tapered portion of the blank. The blank 2 is then pressed firmly agaist the stationary abutment 5 and is automatically centered by the engagement of the cutting edges of the die with the tapered blank portion. As the ram 8 continues to advance, the stripping rod 9 engages the end of the blank and holds it firmly against the stationary abutment 5 while the die 4 shears the surplus metal from the sides of the head. The forward movement of the die 4 continues until the end of the abutment 5 enters the opening 11 of the female die 4 as shown in Fig. 2, thereby completing the trimming operation.

After the blank 3 has been trimmed, the movable ram 8 is automatically withdrawn carrying with it the elements associated therewith, together with the finished blank 3. Upon reaching a predetermined position, the stripping rod 9 is automatically held while the ram 8, holder 7 and die 4 continue their rearward travel. The finished blank 3 is thus forced through the opening 11 of the die 4 and is eventually ejected from the machine. The next rough blank 2 is then properly positioned by the finger 6 after which the cycle of trimming and ejecting operations is repeated.

It will be obvious that with the apparatus described and with the method of operating the same to trim the blanks 2 in succession, each of the trimmed blanks will be identical with all others. The heads of the blanks will be concentric relatively to the cylindrical shanks thereof due to the automatic centering effected by the tapered blank portions. The blanks are passed through the machine in succession and at a relatively high rate of speed thereby producing maximum output. The die 4 may be readily adjusted to compensate for wear, and may be quickly removed from the machine for inspection and repairs.

It should be understood that it is not desired to limit the invention to the exact steps of the method disclosed, for obvious modifications may occur to persons skilled in the art.

It is claimed and desired to secure by Letters Patent:—

1. The method of trimming blanks, which comprises, forming a blank with a portion sufficiently over-size to permit trimming and with a centering portion adjacent to said over-size portion, placing said blank against an abutment, and trimming said blank by moving a die successively against said centering portion and along said over-size portion.

2. The method of trimming blanks, which comprises, forming a blank with an end portion sufficiently over-size to permit trimming and with a centering portion adjacent to said over-size portion, placing the end of said blank adjacent to said over-size portion against an abutment, and trimming said blank by moving a die successively against said centering portion and along said over-size end portion.

3. The method of trimming blanks, which comprises, forming a blank with a head sufficiently over-size to permit trimming and with a smaller shank connected with said head by a centering portion, placing said head against an abutment and trimming said head by a die successively against said centering portion and along said head.

4. The method of trimming the heads of set screw blanks, which comprises, forming a blank with a head sufficiently oversize to permit trimming and with a smaller shank connected with said head by a tapered portion, placing the end of said head remote from the shank against an abutment, and trimming said head by moving a die successively against said tapered portion and along said head.

5. The method of trimming the heads of set screw blanks, which comprises, forming a blank with a head sufficiently oversize to permit trimming and with a smaller shank connected with said head by a gradually tapered portion, placing the end of said head remote from the shank directly against a stationary abutment, and trimming said head by moving a die successively over said shank, against said tapered portion and along said head.

6. The method of trimming the heads of set screw blanks, which comprises, forming a blank with a square head sufficiently oversize to permit trimming and with a cylindrical shank connected with said head by a gradually tapered portion, placing the end of said head remote from the shank directly against a stationary abutment, and trimming said head by moving a square female die successively over said shank, against said tapered portion and along said head.

7. The method of trimming the heads of set screw blanks, which comprises, forming a blank with a head and a tapered portion adjacent thereto, placing the head of said blank directly against a stationary abutment, and guiding a trimming die concentrically of said head with the aid of said tapered portion.

8. The method of trimming the heads of set screw blanks, which comprises, forming a blank with a head and a tapered portion adjacent thereto, placing the end of said head remote from said tapered portion directly against a stationary abutment, and trimming said head by moving a die successively against said tapered portion and along said head.

9. The method of trimming the heads of set screw blanks, which comprises, forming a blank with a square head sufficiently oversize to permit trimming and with a cylindrical shank connected with said head by a gradually tapered portion, placing the end of said head remote from said tapered portion directly against a stationary abutment, and trimming said head by moving a die successively over said shank, against said tapered portion, along said head, and over said abutment.

10. The method of trimming blanks, which comprises, forming blanks with projections thereon, utilizing said projections to facilitate feeding of the blanks, and subsequently removing said projections while trimming said blanks.

11. The method of trimming blanks, which comprises, forming rough blanks with heads and with projections on the heads, utilizing said projections to facilitate feeding of the blanks, and subsequently removing said projections while trimming said blank heads.

12. The method of trimming blanks, which comprises, forming rough blanks with rectangular prismatic heads and with annular flanges projecting laterally from said heads, utilizing said flanges to facilitate automatic feeding of said blanks, and subsequently simultaneously trimming said blanks and removing said flanges.

In testimony whereof, the signature of the inventor is affixed hereto.

BIRGER W. LINDQUIST.

Witnesses:
ALMA E. ZENTGREBE,
GEO. J. LIEBER.